United States Patent [19]
Hottenroth et al.

[11] 3,868,943
[45] Mar. 4, 1975

[54] PORTABLE FORCED DRAFT SOLID FUEL BURNING COOKER

[76] Inventors: Fred W. Hottenroth, 1740 Interlachen, Seal Beach, Calif. 90740; Fred W. Hottenroth, III, 3415 Lama Ave., Long Beach, Calif. 90808

[22] Filed: June 21, 1974

[21] Appl. No.: 481,500

[52] U.S. Cl. .............................. 126/25 R, 126/9 R
[51] Int. Cl. ........................... F24b 3/00, F24c 1/16
[58] Field of Search .......... 126/25, 9 R, 43; 110/1 F

[56] References Cited
UNITED STATES PATENTS
3,279,452  10/1966  Hottenroth, et al. ............. 126/25 R
3,664,321  5/1972  Chiov................................ 126/9 R FOREIGN PATENTS OR APPLICATIONS
322,959  9/1917  Germany............................ 126/9 R
564,209  2/1958  Belgium............................... 126/25

*Primary Examiner*—William F. O'Dea
*Assistant Examiner*—Harold Joyce
*Attorney, Agent, or Firm*—William C. Babcock

[57] ABSTRACT

A two piece portable forced draft, solid fuel burning cooker that includes a cooker assembly and blower assembly of such structure that the blower assembly may be removably nested in the cooker assembly when the cooker is in a first position to provide a compact unit that is easily transported such as on a hiking trip or the like. The cooker when in a second position capable of supporting and heating a cooking utensil, with the fuel used for supplying heat from the cooker being that which is commonly available, as for instance, charcoal briquetts, acorns, pieces of small tree branches, twigs and the like.

8 Claims, 5 Drawing Figures

PATENTED MAR 4 1975  3,868,943

3,868,943

PORTABLE FORCED DRAFT SOLID FUEL BURNING COOKER

BACKGROUND OF THE INVENTION

1. Field of the Invention

Portable forced draft solid fuel burning cooker.

2. Description of the Prior Art

In the past, a number of forced draft, solid fuel burning cookers have been designed and used. The prior art devices have the operational disadvantages that they are somewhat bulky and cumbersome, and are not capable of being disposed in a compact carrying arrangement, such as would encourage their widespread use by hikers and other outdoor sportsmen that travel substantial distances.

A primary object in devising the present invention is to supply a cooker that is light in weight, is of extremely simple mechanical structure, may be positioned in a compact first form for ease of transporting the same, and when needed the cooker is readily positioned in a second form to supply heat to and support a cooking utensil thereon.

Another object of the invention is to furnish a cooker in which the heat resulting from the burning of the fuel is efficiently utilized, by the major portion of the heat that would be wasted by radiation being employed to preheat the air prior to the latter being discharged as a number of streams transversely across the fuel to support the combustion thereof.

Yet another object of the present invention is to supply a cooker that substantially overcomes the operational disadvantages of prior art devices of this nature, particularly when the devices are to be carried by hikers and the like.

SUMMARY OF THE INVENTION

The invention is a portable forced draft, solid fuel burning cooker, which when in a first position occupies a minimum of space for ease in transportation, and when in a second position is adapted to support and heat a cooking utensil.

The cooker is in two parts, and includes a heater assembly that includes first and second cup shaped shells having continuous side walls and flat bottoms, with the first shell being substantially greater in diameter than the second shell. A rigid ring shaped member joins the free circumferential edges of the first and second shells and so maintains the side walls and bottoms in such relationship that a confined space is defined therebetween. A third cup shaped shell is intermediately disosed in a fixed position between the first and second shells and subdivides the confined space into first and second passages. The bottom of the first shell has a centered opening formed therein that is in communication with the first passage. A number of spaced openings are formed in the side wall of the second shell at a substantial distance above the bottom thereof, with the second openings being in communication with the second passage, and the second shell capable of holding a number of pieces of combustible material that burns when streams of air from the second openings are directed transversely thereacross. The ashes resulting from this burning tend to move downwardly by gravity to rest on the bottom of the second shell and will not obstruct the second openings through which air is discharged.

A blower assembly supports the heater assembly when the cooker is in the second position. The blower assembly includes the base, an electric motor secured to the base and extending outwardly therefrom, and the motor having a drive shaft on which a fan is rigidly secured. The blower assembly further includes two laterally spaced rigid walls that are secured to the base and situated on opposite sides of the motor, a flat rigid ring shaped plate that is disposed parallel to the base and secured to the portions of the walls most remote from the base, with the fan being axially aligned with a third opening defined within the ring. A battery is supported from the blower assembly and electrical conducting means and a manually operated switch are operatively connected to the battery and to the motor. The fan, plate and side walls and motor are of such size that they be completely inserted as a unit within the second shell when the cooker is disposed in the first position. The base is of such size as to rest on the plate when the cooker is so disposed in the first position.

Engaging means are provided on the plate. Engageable means are formed as a part of the base that removably engage the engaging means when the cooker is in the first position, to maintain the cooker in the compact arrangement shown in FIG. 1. when the cooker is in the second position and the switch is closed, the electric motor is energized to drive the fan to discharge air through the first and second passages to escape through the second openings in the side wall of the second shell to flow transversely across solid fuel situated in the heater assembly to assure the combustion thereof as the invention is used for its intended purpose. As the air flows through the first and second passages it is preheated due to the burning fuel. Preheating of the air utilizes heat from the burning fuel that would otherwise be wasted by radiation from the cooker.

DESCRIPTION OF THE PREFERRED EMBODIMENT

Figure 1:
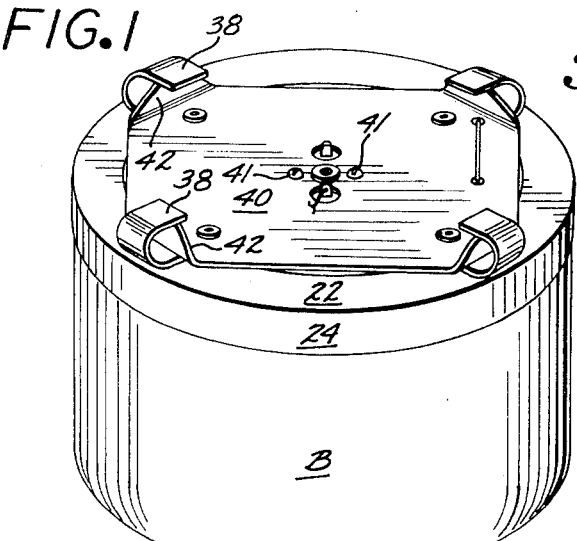
FIG. 1 is a perspective view of the cooker in a first position.
Figure 2:
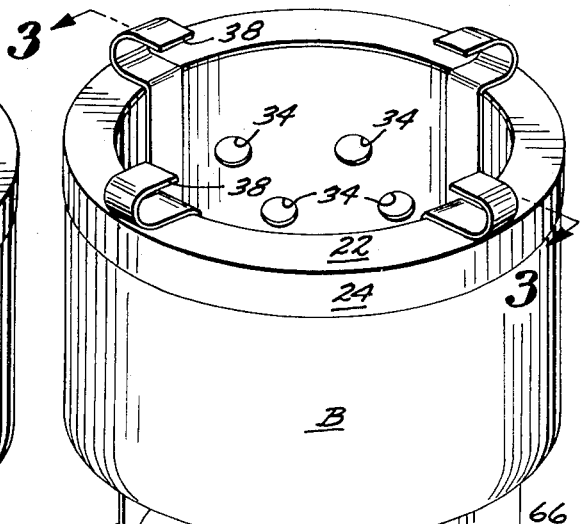
FIG. 2 is a perspective view of the cooker in a second position.

The cooker A as may be ssen in the drawing includes a heater assembly B and blower asembly C that are of such structure that when the cooker is in the first position illustrated in FIG. 1 the blower assembly nests within the heater assembly, and a compact package is provided that is easily carried by a hiker or the like. In FIG. 2 the cooker A is shown disposed in a second position whereby it is capable of supporting and heating a cooking utensil (not shown).

Heater assembly B includes a first outer cup shaped metallic sheel 10 that is defined by a first flat bottom 12 and a continuous side wall 20. The second shell 16 is of substantially less diameter than the first shell 10.

The second shell has a ring 22 projecting outwardly from the upper periphery thereof with the ring on its outer edge developing into a depending cylindrical flange 24 that slidably and frictionally engages the upper external surface of the side wall 14. The first and second shells 10 and 16 cooperate to define a confined space S therebetween.

Figure 3:
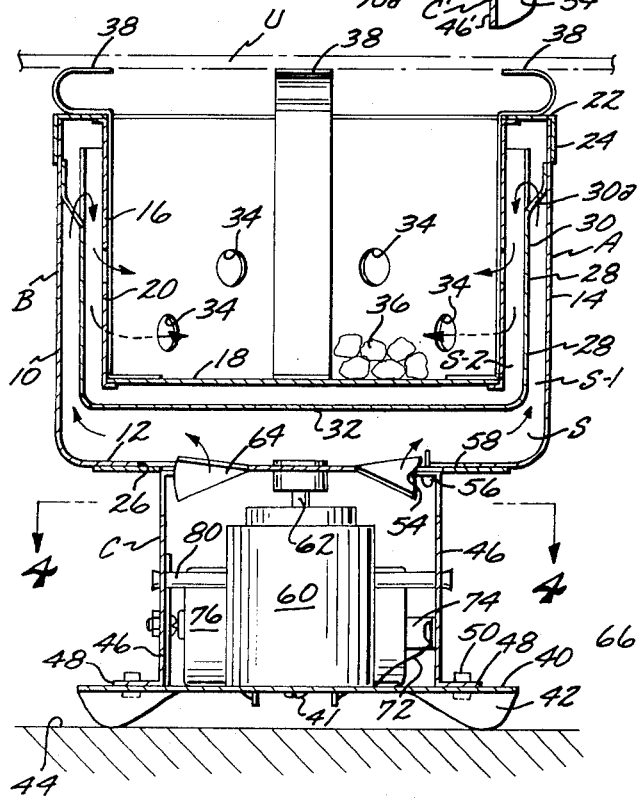
FIG. 3 is a vertical cross sectional view of the cooker in a second position and taken on the line 3—3 of FIG. 2.

The bottom 12 as may best be seen in FIG. 3 has a first opening 26 of substantial diameter formed thereon. A third cup shaped shell 28 is provided, and is interposed in a fixed position within the confined space S as best seen in FIG. 3, with the third shell including a cylindrical side wall 30 and flat bottom 32. The third shell 28 cooperates with the first and second shells 10 and 16 to sub-divide the confined space S into a first annulus shaped passage S-1 and a second annulus shaped passage S-2. Air is supplied to the first passsage S-1 through the first opening 16 by the blower assembly C as will later be explained in detail.

The third shell 29 is rigidly supported in confined space S by a number of circumferentially spaced clips 30a that extend outwardly therefrom from the side wall 30 of the third shell 28, and these clips being rigidly secured to the interior surface of the first side wall 14 by conventional means such as spot welding or the like (not shown).

The second passage S-2 is in communication with a number of circumferentially and vertically spaced second openings 34 formed in the second side wall 20 as best seen in FIG. 3. The second openings 34 due to being so disposed are adapted to discharge transverse currents of air over fuel 36, shown in phantom line in FIG. 3, to facilitate the burning of the latter.

The second shell 16 has a number of circumferentially spaced hook shaped clips 38 secured thereto as may best be seen in FIGS. 1, 2 and 3. The purpose of the clips 38 will later be explained.

Figure 4:
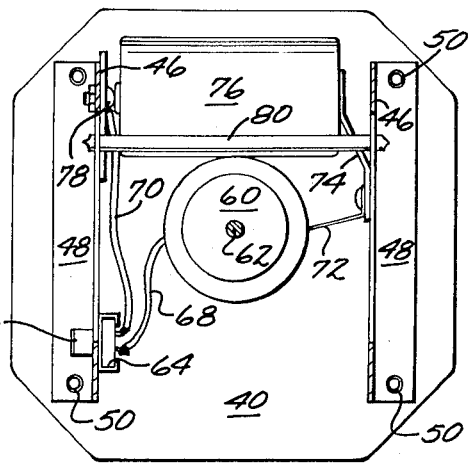
FIG. 4 is a transverse cross sectional view of the cooker taken on the line 4—4 of FIG. 3.

The blower assembly C as may be seen in FIGS. 3 and 4 includes a sheet metal base 40 that is substantially square in shape, and is of greater area than the interior transverse area of the second shell 20. The base 40 has the corner portions bent downwardly to define members 42 as can best be seen in FIG. 3 that are adapted to rest on a supporting surface 44 when the cooker A is in the second position. The members 42 are removably engaged by the clips 38 when the cooker A is disposed in the first position shown in FIG. 1, and the blower assembly C rotated relative to the heater assembly B.

Blower assembly C includes two laterally spaced parallel walls 46 that have two normally disposed legs 48 on the lower portions thereof as can best be seen in FIG. 4, which legs rest on the upper surface of the base 40 and are secured thereto by conventional fastening means 50 such as screws or pins. The upper ends of the walls 46 define two legs 54 that extend towards one another and have small pins or screws 56 extending upwardly therethrough to engage and hold a ring shaped plate 58 on the upper ends of the walls 46. The pins 56 not only serve the fastening function previously mentioned, but by being disposed within first opening 26 prevent the heater assembly B being inadvertently slid transversely from the plate 58 when the cooker A is in the second position shown in FIGS. 2 and 3.

An electric motor 60 is mounted on the base 40 by screws 41 as can best be seen in FIG. 3, and the motor including an upwardly extending drive shaft 62 on which a fan 64 is rigidly mounted. The fan 64 is adjacently disposed to the first opening 26. A manually operated switch 64 is supported on one of the walls 46, and the switch includes a handle 66 that may be moved to dispose the switch in either an open or closed position. The switch 64 has first and second insulated electrical conductors 68 and 70 extending therefrom, with the first conductor being connected to a first terminal of the motor 60, and the second terminal of the motor 60 being connected by a third conductor 72 that extends to and is secured to a resilient clip 74 best seen in FIG. 4 that is in pressure and electrical contact with one end of a flashlight battery 76. The opposite end of the battery 76 is in pressure and electrical communication with an electrical contact 78 that is supported in an electrical insulating position from the side wall 46 in which it is mounted. The contact 78 is connected to the second electrical conductor 70 as shown in FIG. 4. A bar 80 extends transversely between the walls 46 as shown in FIG. 4 and limits the extent to which the battery 76 may move transversely relative to the motor 60. When the handle 66 is moved to a position in which the switch 64 is closed the motor 60 is energized with the fan being driven as a result thereof. A wire clip (not shown) may be provided to prevent the battery 76 inadvertently slipping from the position shown in FIG. 3 should the blower assembly C be subjected to a sharp jolt.

The fan 64 discharges air upwardly into the first passage S-1, with the ring 22 directing the air from the first passage downwardly into the second passage S-2 where it escapes through the second opening 24 to flow transversely over the fuel 36 to facilitate the burning of the latter. As the fuel 36 burns the heat therefrom it serves to heat the bottom of a cooking utensil U, a portion of which is shown in phantom line in FIG. 3, and the utensil U being supported on the clips 38. Air as it flows through the first and second passages S-1 and S-2 is heated by heat from the burning of the fuel 36, and this heat being utilized to preheat the air prior to the latter discharging into the confines of the second shell 16 through the second opening 34. This preheating of the air efficiently utilizes heat from the fuel 36 that would otherwise be wasted. When the cooker A has served its intended purpose in heating the utensil U as shown in FIG. 3, the fuel 36 is discharged from the second shell 16, and the blower assembly C is then disposed to have the base 40 rest on the ring 22 as shown in FIG. 1.

The components of the blower assembly C mounted on the base 40 are of such size that they may be nested completely within the confines of the second shell 16, with portions of the base 40 resting on the ring 22. By rotating the blower assembly C relative to the heater assembly B the members 42 may be caused to engage the clips 38 to removably hold the heater assembly B and blower assembly C together as a compact unit in a first form as shown in FIG. 1. When it is desired to use the cooker A for cooking purposes, the above described operation is simply reversed, with the heater assembly B then being removably mounted on the blower assembly B in the second position shown in FIGS. 2 and 3. Fuel 36 in the form of charcoal briquetts, acorns, twigs or the like is now placed in the second shell 16 to occupy the position as shown in FIG. 3, with the fuel then being ignited and the motor 60 energized to drive the fan 64. Air now discharges through the second openings 34 to support the combustion of the fuel 36, and as the fuel burns heat is transferred to the utensil U, and heat radiated and conducted through the second shell 16 and third shell 28 preheating the air flowing through the passages S-1 and S-2.

Figure 5:
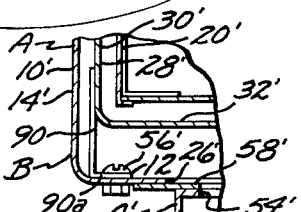
FIG. 5 is a fragmentary vertical cross sectional view of an alternate form of the invention.

An alternate form A' of the invention is shown in FIG. 5 that operates in the same manner and produces the same results as the form A of the invention previously described. In FIG. 5 elements of the alternate form A' of the invention common to the form A are identified by the same letters and numbers previously used, but with primes being added thereto.

The ring shaped plate 58' is secured to the horizontal legs 54' by conventional means (not shown) such as tack welding or the like. The third shell 28' has a number of circumferentially spaced L-shaped clips 90 secured thereto, one of which is shown in FIG. 5. Each clip 90 includes a lower horizontal leg 90a. Each leg 90a has a screw or pin 56' extending downwardly through it and the bottom 12' against which the leg abuts, and the screw 56' including a downwardly projecting portion disposed adjacent the outer periphery of the ring shaped plate 58' to prevent the heater assembly B' being inadvertently slid laterally from the blower assembly C'. The clips 90 and screws 56' serve to hold the third shell 28 in spaced relationship with the sidewall 14' and 20'. The screws 56' also serve a second function of prevention the cooker assembly B' from being inadvertently displaced from blower assembly C'.

The use and operation of the invention has been previously described in detail and need not be repeated.

We claim:

1. A portable forced draft solid fuel burning cooker that may be selectively disposed in either a first compact position for ease of transportation or in a second position in which said cooker is capable of supporting and heating a cooking utensil, which cooker includes:
    a. a metallic heater assembly that includes a first outer cup shaped shell, a second inner cup shaped shell in which the solid fuel is disposed when the cooker is in said second position, a ring that joins free peripheral edges of said first and second shells, said second shell of substantially less transverse area than said first shell and said first and second shell cooperating with said ring to define a confined space of which a portion is of annulus shape, a third cup shaped shell interposed in a fixed position between said first and second shells that subdivides said confined space into inner and outer passages in which air is preheated by the combustion of said fuel after said air enters a first opening in said first shell in the portion thereof most remote from said ring to flow through said first and second passages and discharge from a plurality of spaced second openings in said second shell transversely across said fuel to support the combustion of the latter, and first means for supporting said third cup shaped shell in said fixed position;
    b. a blower assembly that removably supports said heater assembly thereon when said cooker is in said second position, said blower assembly including a base of greater area than the transverse interior area of said second shell, electrically operated blower means mounted on said base for discharging a current of air through said first opening to flow through said first and second passages, said electrically operated blower means of such size as to be disposed within said second shell when the latter is free of fuel and said cooker occupies said first position with said base supported by said ring;
    c. engaging means on said ring; and
    d. engageable means on said base that removably engage said engaging means when said cooker is in said first position to hold said heater assembly and blower assembly together as an integral unit for ease of transportation.

2. A cooker as defined in claim 1 in which said engaging means are a plurality of circumferentially spaced clips secured to said ring and extending outwardly therefrom and said engageable means are a plurality of spaced members that occupy fixed positions relative to said base and removably engage said clips when said heater assembly and blower assembly are rotated relative to one another when said cooker is in said first position.

3. A cooker as defined in claim 2 in which said base is substantially square and said members are angularly disposed, out turned corner portions of said base.

4. A cooker as defined in claim 1 which in addition includes:
    e. a plurality of circumferentially spaced tabs that extend outwardly from said third shell and are secured to said first shell to hold said third shell in a fixed position between said first and second shells.

5. A cooker as defined in claim 1 in which said blower assembly includes:
    e. two laterally spaced walls that extend from said base and are rigidly secured thereto;
    f. a ring shaped plate parallel to said base;
    g. a plurality of circumferentially spaced pins that secure said plate to said walls and project outwardly therefrom in a direction away from said base, said pins so spaced as to removably engage said first opening to prevent said heater assembly being inadvertently slid laterally to be displaced from said blower assembly when said cooker is in said second position.

6. A cooker as defined in claim 5 in which said blower means includes:
    h. an electric motor mounted on said base;
    i. a fan driven by said motor and adjacently disposed to a third opening defined in said plate, said fan being adjacently disposed to said first opening when said cooker is in said second position;
    j. a battery removably supported between said walls;
    k. a manually operated electric switch that occupies a fixed position relative to said base and walls; and
    l. electrical conducting means that connect said switch and battery to said electric motor to energize the latter when said switch is closed and said cooker is in said second position.

7. A cooker as defined in claim 1 in which said engaging means are a plurality of circumferentially spaced clips secured to the interior surface of said first shell and the exterior surface of said third cup shaped shell.

8. A cooker as defined in claim 7 in which said engaging means are a plurality of circumferentially spced L-shaped clips that project downwardly below said third cup shaped shell and abut against the portion of said first shell adjacent said first opening therein, and a plurality of screws that extend through said clips and first shell to project downwardly below the latter, with said blower assembly including:
    e. two laterally spaced walls that extend from said base and are rigidlly secured thereto;

f. a ring shaped plate parallel to said base and secured to the portions of said walls most remote from said base, said ring shaped plate having a third opening in the center thereof and an outer periphery, with said first and third openings being vertically aligned when said cooker is in said second position, and said projecting portions of said screws adjacently disposed to said periphery of said ring shaped plate to prevent said heater assembly being inadvertently slid laterally from said blower assembly.

* * * * *